United States Patent
Becher

(10) Patent No.: US 6,519,232 B1
(45) Date of Patent: *Feb. 11, 2003

(54) METHOD FOR IMPLEMENTING SERVICES OF AN INTELLIGENT NETWORK USING A DATA NETWORK

(75) Inventor: Reinhard Becher, München (DE)

(73) Assignee: Siemens Aktiengellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,623

(22) Filed: Dec. 22, 1999

Related U.S. Application Data

(63) Continuation of application No. PCT/DE99/01063, filed on Apr. 7, 1999.

(30) Foreign Application Priority Data

Apr. 22, 1998 (DE) .......................... 198 18 006

(51) Int. Cl.[7] ........................... H04G 7/00; H04L 12/66
(52) U.S. Cl. .................... 370/314; 370/328; 379/88.17; 379/900
(58) Field of Search ................................. 370/314, 328, 370/337, 352, 410, 420, 345, 349; 379/88.17, 103, 105, 900; 455/432, 460, 461, 523

(56) References Cited

U.S. PATENT DOCUMENTS

| 5,978,386 A | * 11/1999 | Hamalainen et al. ....... 370/466 |
|---|---|---|
| 5,978,450 A | * 11/1999 | McAllister et al. ...... 379/88.02 |
| 5,978,672 A | * 11/1999 | Hartmaier et al. .......... 455/413 |
| 6,047,194 A | * 4/2000 | Anderson .................... 455/466 |
| 6,052,372 A | * 4/2000 | Gittins et al. ................ 370/396 |
| 6,055,232 A | * 4/2000 | Ward et al. .................. 370/385 |
| 6,058,303 A | * 5/2000 | Astrom et al. .............. 455/413 |
| 6,101,387 A | * 8/2000 | Granberg et al. ........... 455/414 |
| 6,151,491 A | * 11/2000 | Farris et al. ................. 455/412 |
| 6,163,701 A | * 12/2000 | Saleh et al. .................. 455/456 |
| 6,181,927 B1 | * 1/2001 | Welling et al. ......... 379/201.02 |
| 6,192,237 B1 | * 2/2001 | Clapton et al. .............. 455/422 |
| 6,212,391 B1 | * 4/2001 | Saleh et al. .................. 455/456 |
| 6,353,740 B1 | * 3/2002 | Granberg ..................... 455/432 |

FOREIGN PATENT DOCUMENTS

| WO | 97/31491 | * 8/1997 | ............ H04Q/3/00 |
|---|---|---|---|
| WO | 99/34612 | * 7/1999 | |
| WO | 99/60801 | * 11/1999 | ............ H04Q/3/00 |

* cited by examiner

*Primary Examiner*—Hassan Kizou
*Assistant Examiner*—Ahmed Elallam
(74) *Attorney, Agent, or Firm*—Laurence A. Greenberg; Werner H. Stemer; Ralph E. Locher

(57) ABSTRACT

A method for implementing an intelligent service includes the step of offering the intelligent service with an intelligent network of a telephone system. Messages are exchanged interactively between a subscriber of the telephone system and a peripheral unit. The subscriber is authorized to use at least the intelligent service. The telephone system includes, in addition to the intelligent network, at least one telephone network which is linked to the intelligent network. Information relating to the intelligent service is exchanged between the peripheral unit and a service control node via a connection which is established in a data network.

30 Claims, 1 Drawing Sheet

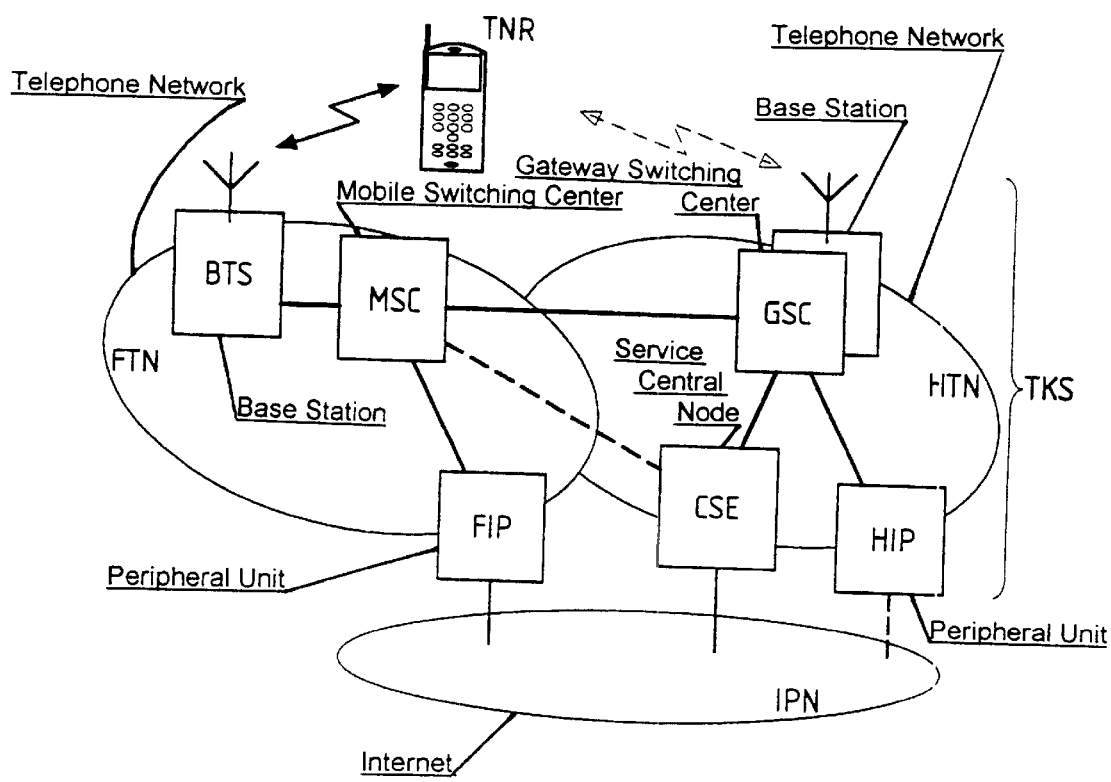

METHOD FOR IMPLEMENTING SERVICES OF AN INTELLIGENT NETWORK USING A DATA NETWORK

CROSS-REFERENCE TO RELATED APPLICATION

This application is a continuation of copending International Application PCT/DE99/01063, filed Apr. 7, 1999, which designated the United States.

BACKGROUND OF THE INVENTION

Field of the Invention

The invention relates to a peripheral unit which is set up to interactively exchange messages with subscribers of a telephone system which has an intelligent network with a service control node for managing and controlling intelligent services and which has at least one telephone network linked to the intelligent network. At least one of the subscribers of the telephone system is authorized to use one or more intelligent services.

Furthermore, the invention relates to a telephone system which has an intelligent network with a service control node for managing and controlling intelligent services for subscribers of the intelligent network and at least one telephone network which is linked to the intelligent network and in which one or more peripheral units which are set up for the interactive exchange of messages with subscribers of the telephone system are provided. At least one of the subscribers of the telephone system is authorized to use one or more intelligent services.

The invention relates also to a method for implementing an intelligent service which is made available by an intelligent network and in which messages are exchanged interactively between a peripheral unit of a telephone system and a subscriber of the telephone system, who is authorized to use at least the intelligent service. The telephone system has, in addition to the intelligent network, at least one telephone network which is linked to the intelligent network, and the intelligent network has a service control node for managing and controlling intelligent services.

Telecommunications networks, in particular telephone networks, are implemented as fixed networks or mobile radio networks, such as the known GSM network (Global System for Mobile communications) and have switching devices which are networked to one another and which are used to set up and receive call connections between the subscribers of a network. In order to allow connections between subscribers of different networks, the telephone networks are linked to one another on the basis of corresponding cooperative agreements, and then form a superordinate telephone system. In such a telephone system, a subscriber is assigned in each case to a specific network, his home network, in which the subscriber data, and for example the call-metering, are managed. The concept of the home network is important in particular for mobile subscribers which "roam" between networks, i.e. can change to the coverage area of a different mobile radio network and continue to make calls in it, provided there is provision for this in a so-called roaming agreement between the home network of the subscriber and the network which is being visited.

In mobile radio networks, base stations, which can be used to connect telecommunications terminals via an air interface, are respectively connected to the switching devices. These terminals permit a subscriber of a mobile network to access the network. Moreover, the switching devices are also set up to interface with other networks, for example a data transmission network or a fixed network.

From the GSM network it is also known to use, within a mobile network, memory units in which subscriber-specific data relating to the network's own services are respectively stored. One of these memory units implements the so-called home register (HLR, Home Location Register) which is usually located at a fixedly defined location and in which data on which the registration of the subscriber is based are stored.

For the mobile subscriber and the base station which is connected to it, a memory unit is provided as a so-called visitor register (VLR, Visiting Location Register) in which the subscriber-specific and connection-specific data are stored, and which is usually implemented in a mobile switching node (MSSP, Mobile Service Switching Point). Depending on the current location of the mobile subscriber, the memory unit also changes for the visitor register or the switching node.

Thus, each subscriber of a mobile network has the possibility of "roaming", i.e. changing between cells, that is to say between coverage areas of the base stations, possibly even during a call. The changeover between the cells is ensured, as is known from the example of the GSM network, through the use of protocols which are set up for this purpose and through the use of which the subscriber data are exchanged, for example, between a home register which is permanently assigned to the subscriber, and the visitor register of the respective current cell.

At present, different protocols are used for the communication between the switching units, for example INAP protocols (Intelligent Network Application Part) such as the Core INAP according to the ETSI specification 300 374-1, July 1994, of the European Telecommunications Standards Institute (ETSI) or the MAP protocol (Mobile Application Part) of the GSM standard. These protocols are usually used within networks. Furthermore, from ETSI specifications a so-called CAMEL platform (Customized Application for Mobile Network Enhanced Logic) is known, which is intended to permit additional provider-specific services for subscribers to be supported even between networks.

In a so-called intelligent network (IN or ISDN, Integrated Services Digital Network), in addition to the basic services such as the telephone service and facsimile service of a telephone network, further services are set up which can be taken up by a subscriber of the intelligent network. These services—referred to below as intelligent services—may be, for example, supplementary services in addition to the basic services, for example a call divert service, a call forwarding service, management-oriented services, for example an interrogation of the call tolls which have been incurred by a subscriber, or application services based on the basic services, for example a bank account transaction service in which bank account transactions and other banking transactions can be carried out and logged on the telephone. For the management and implementation of the services, there is a service control node, which is usually referred to as an SCP (Service Control Point) or, in particular in the CAMEL standard, as a CSE (CAMEL Service Environment), in the intelligent network, and it is generally different from the switching devices of the intelligent network. In an intelligent network which is implemented as a GSM network, the service control node can also perform the functions of the home register. The CAMEL standard specifies a CAP protocol (CAMEL Application Part), a set of messages which can also be used between networks, for the signaling between a mobile switching node and a service control node.

Particular intelligent services require subscriber interaction in which an interactive exchange of messages takes place, for example, the subscriber is played a recorded message or requested to enter data, and the entered data are received. According to the Core INAP, so-called intelligent peripheral units (IP) are provided which provide the intelligent services for the implementation of the subscriber interactions with a number of Service Resource Functions (SRF); these are referred to below as peripheral units, for short. A peripheral unit is connected to a switching node of the network via a protocol for signaling between switching centers or for signaling between subscribers.

In many intelligent networks, it is possible for a subscriber to make use of intelligent services only within his home network. In the CAMEL standards, there is provision for intelligent services also to be used by "roaming" subscribers, that is to say subscribers which are located in another network. However, if the service requires a subscriber interaction, calls from roaming subscribers must be diverted into the home network because the respective peripheral unit can only be addressed in the home network. This is often cumbersome and time-consuming and also incurs high tolls or fees for the subscriber.

In principle, it is also conceivable to set up a peripheral unit of the home network in another network, in which case the home network makes its service resource functions available to the other network. However, this requires that the protocols of the peripheral unit and those for the switching operations in the other network correspond, that the other network supports the CAMEL standards and, last but not least, that the operator of the other network is in fact willing to accept an "external" unit into his network. This requires a high degree of cooperation which goes far beyond a roaming agreement and which, owing to the associated complexity, is only likely to be accepted by the network operators involved, if at all, within the scope of a telecommunications alliance.

The same applies to another solution in which peripheral units are used jointly by different network operators and/or service providers. However, the service resource functions of such peripheral units generally have to support more than one language, and must generally be agreed among the operators involved, and there must be clarification, at least in part, so that this also results in extensive cooperation requirements with the above-mentioned consequences.

SUMMARY OF THE INVENTION

It is accordingly an object of the invention to provide a method of implementing services of an intelligent network which overcomes the above-mentioned disadvantages of the heretofore-known methods of this general type. It is in particular an object to permit subscriber interactions to be implemented such that the above-mentioned disadvantages are avoided and especially such that the requirements for the respective peripheral units and network nodes are less stringent.

With the foregoing and other objects in view there is provided, in accordance with the invention, in a communications network including a telephone system having a telephone network, an intelligent network, a data network, and a subscriber, the intelligent network being configured for exchanging digital information, being linked to the telephone network, and having a service control node for managing and controlling intelligent services, the subscriber being a service-authorized subscriber authorized to use at least one of the intelligent services, and the service control node having a data network access, a peripheral unit configuration, including a peripheral unit configured for an interactive exchange of messages with the service-authorized subscriber and having access to the data network, the peripheral unit establishing, via the data network, a connection to the service control node and obtaining information for the service-authorized subscriber relating to one of the intelligent services.

In accordance with another feature of the invention, the peripheral unit obtains, with the connection established via the data network, information for executing the interactive exchange of the messages, prior and/or during the interactive exchange of the messages with the service-authorized subscriber.

In accordance with yet another feature of the invention, the peripheral unit transmits, after terminating the interactive exchange of the messages with the service-authorized subscriber, an acknowledgment message to the service control node, the acknowledgment message containing data determined from the interactive exchange of the messages.

In accordance with a further feature of the invention, the peripheral unit is assigned to the telephone network linked to the intelligent network of the telephone system.

In accordance with yet a further feature of the invention, the peripheral unit requests, from the data network, a connection set-up to the service control node.

In accordance with another feature of the invention, the peripheral unit is assigned to the telephone system, the telephone system being a mobile system, and the peripheral unit establishes a radio connection to the subscriber, the subscriber being a mobile subscriber.

In accordance with yet another feature of the invention, the peripheral unit is configured to operate in accordance with a GSM standard and is assigned to the telephone system, the telephone system being a GSM network, and the peripheral unit establishes a radio connection to the subscriber, the subscriber being a mobile subscriber.

In accordance with an added feature of the invention, the peripheral unit is configured for an interactive exchange of messages with a plurality of subscribers.

The object of the invention is achieved with a peripheral unit which has an access to a data network, the data network being set up for the exchange of digital information, and wherein the peripheral unit is set up to obtain, via a connection, which is established in the data network, to the service control node which also has a data network access, information relating to an intelligent service for a service-authorized subscriber.

This solution has, inter alia, the advantage that any desired common protocol can be used for the transmission of data between a peripheral unit and a service control node. It is also advantageous that usually low tolls, often only the local call charge, are incurred for connections via the data network, for example via the Internet, which benefits the subscriber particularly when he or she is located in other networks.

In a particularly expedient embodiment, the peripheral unit is set up to obtain, via the data network connection, information for the execution of an interactive exchange of messages, before the execution of the exchange of messages with the service-authorized subscriber and/or during the exchange. This permits the exchange of information to be configured in a flexible way as a function of the current processing or current sequence of the subscriber interaction.

According to a preferred embodiment, the peripheral unit is set up to transmit, after the termination of the interactive exchange of messages with the service-authorized subscriber, an acknowledgment message to the service control node, the acknowledgment message containing data which are determined in the exchange of messages. This makes it possible to send back to the service control node result data, reports or the like relating to the subscriber interaction.

It is also advantageous, in particular for subscriber interactions with subscribers in a telephone network which is linked to the intelligent network, when the peripheral unit is assigned to the respective telephone network of the telephone system.

The peripheral unit is expediently set up to request, on its own, from the data network the establishment of the connection to the service control node.

In a further embodiment in which the use of external peripheral units results in particular advantages, the peripheral unit is assigned to a mobile system for establishing radio connections for mobile subscribers.

In this case, the mobile system is preferably implemented as a GSM network.

With the objects of the invention in view there is also provided, in a communications network including a data network, a telephone system configuration having a telephone system including a telephone network, an intelligent network, and a subscriber, the intelligent network being linked to the telephone network and having a service control node for managing and controlling intelligent services, the subscriber being a service-authorized subscriber authorized to use at least one of the intelligent services, and the service control node having access to a data network configured for exchanging digital information; and a peripheral unit configured for an interactive exchange of messages with the service-authorized subscriber and having access to the data network, the peripheral unit establishing, via the data network, a connection to the service control node and obtaining information for the service-authorized subscriber relating to one of the intelligent services.

In accordance with another feature of the invention, the service-authorized subscriber is a temporary subscriber or a continuous subscriber of the telephone network linked to the intelligent network.

In accordance with yet another feature of the invention, further peripheral units are provided, the peripheral unit and the further peripheral units are accessible by the service control node via the data network and are usable by the telephone network, the service control node selects a given one of the peripheral units based on a subscriber location and based on a desired one of the intelligent services.

In accordance with a further feature of the invention, the service control node transmits, to the telephone network, a message including a destination information for addressing the peripheral unit and a correlation identity containing an initial information for the peripheral unit, the initial information relating to the desired intelligent service.

In accordance with yet a further feature of the invention, the service control node is configured for an access to a computer network or an Internet network operating as the data network.

In accordance with another feature of the invention, the service-authorized subscriber is a mobile subscriber and the telephone system is a mobile system, for example a GSM system, for establishing a radio connection for the mobile subscriber.

The object of the invention is also achieved with a telephone system having at least one peripheral unit which, according to the invention, has an access to a data network which is set up for the exchange of digital information, the peripheral unit being set up to obtain, via a connection which is established in the data network to the service control node which also has a data network access, information relating to an intelligent service for a service-authorized subscriber.

The advantages of this solution correspond to those of the peripheral unit according to the invention.

In a particularly expedient embodiment of the telephone system according to the invention, the service-authorized subscriber is temporarily or continuously a subscriber of a telephone network linked to the intelligent network, the telephone network being a part of the telephone system.

It is also favorable if the service control node is set up to select, from the peripheral units which can be accessed by the service control node via the data network and can be used by the telephone network, one peripheral unit by reference to the area in which the subscriber is located and to the desired intelligent service. In this way, the respectively suitable peripheral unit can be selected in a targeted fashion in accordance with the requested service and the necessary subscriber interaction, respectively.

In this context, the service control node is advantageously set up to transmit to the telephone network a message which has an item of destination information for addressing the peripheral unit and a correlation identity which contains a first or initial information item, relating to the intelligent service, for the peripheral unit.

The data network can also advantageously be a computer network, for example the Internet. Computer networks such as the Internet make connection possibilities available over large areas, even spanning the world, in a comparatively easy and cost-effective way.

In a further embodiment in which the use of external peripheral units provides particular advantages, the telephone system is set up as a mobile system for establishing radio connections for mobile subscribers, and the service-authorized subscriber is such a mobile subscriber.

In this case the telephone system is advantageously implemented as a GSM network.

With the objects of the invention in view there is further provided, a method for implementing an intelligent service, the method includes the steps of offering an intelligent service with an intelligent network of a telephone system; managing and controlling the intelligent service with a service control node of the intelligent network; interactively exchanging messages between a peripheral unit of the telephone system and a subscriber of the telephone system, the subscriber being authorized to use at least the intelligent service; linking a telephone network of the telephone system to the intelligent network; and exchanging information relating to the intelligent service between the peripheral unit and the service control node via the connection established in a data network set up for an exchange of digital information.

In accordance with another mode of the invention, the information relating to the intelligent service are exchanged via the connection established in the data network prior to and/or during the step of interactively exchanging the messages between the peripheral unit and the subscriber; and the information relating to the intelligent service is evaluated for executing the interactive exchanging of the messages.

In accordance with yet another mode of the invention, the interactive exchange of the messages between the peripheral unit and the subscriber is terminated; and subsequently an acknowledgment message containing data determined from the interactive exchanging of the messages is transmitted to the service control node.

In accordance with a further mode of the invention, the subscriber authorized to use at least the intelligent service uses the intelligent service as a subscriber of the telephone network linked to the intelligent network.

In accordance with another mode of the invention, prior to carrying out the intelligent service or interactively exchanging the messages, a given peripheral unit is selected from the peripheral units accessible by the service control node via the data network and usable by the telephone network. The selecting step is based on a subscriber location and on the intelligent service being desired.

In accordance with yet another mode of the invention, a message is transmitted from the service control node to the telephone network. The message has a correlation identity and a destination information for addressing the peripheral unit. The peripheral unit is supplied with the correlation identity as an initial information relating to the intelligent service.

In accordance with an added mode of the invention, the information relating to the intelligent service is exchanged via a computer network, such as an Internet network.

The above-mentioned object of the invention is also achieved by a method in which information relating to the intelligent service is exchanged between the peripheral unit and the service control node via a connection which is established in a data network, the data network being set up for the exchange of digital information.

The advantages provided by the method according to the invention correspond to those of the peripheral unit according to the invention.

BRIEF DESCRIPTION OF THE DRAWING

The single FIGURE is a schematic block diagram of an exemplary network system.

DESCRIPTION OF THE PREFERRED EMBODIMENTS

Referring now to the single FIGURE in detail, there are schematically shown the essential components of an exemplary embodiment of a network system. The invention is explained in more detail below with reference to this exemplary embodiment relating to a GSM network system. The exemplary GSM network system TKS is made up of a plurality of GSM networks, two networks HTN, FTN of those GSM networks are shown in the FIGURE, namely the home network HTN of the subscriber TNR and a further network or remote network FTN, in the coverage area of which the subscriber TNR or its mobile phone is currently located, and which will be referred to below as the other network. The subscriber TNR is signed on to the other network FTN via a radio connection to a base station BTS which is connected to a mobile switching center MSC. In the home network HTN, a service control node CSE is shown in which, inter alia, the permanent, subscriber-specific data for the use of the network services are stored, and a so-called gateway switching center GSC, which is used to link the two networks HTN, FTN to one another. Furthermore, it is, of course, also possible that other network connections exist, for example a direct line between the service control node CSE and the switching center MSC. Switching devices of the home network HTN are, of course, also present, but they are irrelevant to the representation of the invention and are therefore merely indicated in the FIGURE. Likewise, a service control node which may exist in the other network FTN is of no significance for understanding the invention.

It is to be noted at this point that the exemplary embodiment does not constitute a restriction of the invention to mobile radio networks. Rather, the following explanations can readily be transferred by a person skilled in the art to other telephone network systems TKS, in particular fixed networks, for example with a subscriber which is provided access to the same service configuration from different terminals TNR, even from outside his home network. Admittedly, to do this, the home network HTN must be set up to support intelligent services, that is to say it must be an intelligent network.

It will be assumed in the exemplary embodiment that the subscriber TNR calls a call number; the connection request passes to the switching center MSC. On the basis of, for example, the dialed call number and of a subscriber subscription to an intelligent service, the switching center MSC detects that it is necessary to make a service-related inquiry to the service control node CSE of the home network of the subscriber TNR. For this reason, the switching center MSC sets up a signaling connection to the service control node CSE and transmits an appropriate inquiry. An INAP protocol or a CAP protocol may be used for this—the latter protocol is more convenient because the CAP protocol is intended for signaling between networks. The service control node CSE determines from the data of the inquiry, for example a service key contained in it, the desired intelligent service and the area in which the subscriber is located. This "service location" information is used later to select a suitable peripheral unit.

If the service control node CSE ascertains that a subscriber interaction is necessary to process the service, a suitable peripheral unit to which a connection can be established from the switching center MSC is determined with reference to the "service location" information. By virtue of the invention, this can be a peripheral unit FIP which is external to the home network HTN and which has an access to the Internet IPN or another data network. The peripheral unit FIP can, as illustrated in the FIGURE, be connected directly to the switching center MSC or via other network nodes. It is also possible for the peripheral unit FIP to be located in a third network (not illustrated in the FIGURE) of the network system TKS, and for the connection to the switching center MSC also to be between networks; depending on the given conditions, this may be more favorable than connecting to a peripheral unit HIP of the home network HTN. (Whether the home-network peripheral unit HIP has a data network port or data network connection is irrelevant in this context).

The service control node CSE then transmits to the switching center MSC a message with a destination call number which is intended for the addressing of the peripheral unit FIP. The destination call number is composed of the "call number" of the peripheral unit FIP and, advantageously, of an added element or an extension, for example in the manner of a call number with an added element for a subordinate extension line connection, for example a private branch network. The added element serves as a so-called correlation identity which is used, as described below, as a first or initial information item for the peripheral unit FIP.

If the call is to be continued after the subscriber interaction, for example with a further connection or a forwarding to a call number which is determined in the interaction, a respective continuation feature, for example the so-called DP9B-R of the GSM network, is set in the service control node CSE. The continuation feature is transferred to the switching center MSC together with the message of the destination call number, for example in a RequestReportBSCM message of the GSM network.

The switching center MSC then connects the subscriber TNR to the peripheral unit FIP based on the messages which have been received by the service control node CSE. The correlation identity is received by the peripheral unit FIP and buffered, and an address information item and/or control information item for each service resource function, which corresponds to the selected intelligent service, is derived from it. If the information of the correlation identity is sufficient for the implementation of the subscriber interaction and it is not necessary for any data to be signaled back from the peripheral unit FIP to the service control node CSE at the end of the interaction, the interaction is terminated in the other network FTN in the known manner. On the other hand, if, which is the case of interest for the invention, it is necessary to exchange additional service data between the peripheral unit FIP and the service control node CSE, this exchange of information takes place according to the invention via a data connection of the Internet IPN.

A condition for this exchange of data via the Internet is that both the peripheral unit FIP and the service control node CSE of the home network HTN are connected to the Internet and can make, via the Internet, a connection with one another having a sufficient data exchange capacity. At the peripheral unit FIP, the data connection (to the service control node CSE via the Internet IPN) and the interaction connection (to the switching center MSC or to the subscriber TNR) generally exist at the same time. Instead of the Internet, any other data network IPN, for example a computer network or a packet network, which permits a connection-controlled exchange of digital data, can also be used.

The data connection may be permanent or set up specially for the interaction, in the latter case the connection being generally set up by the peripheral unit FIP. Any common protocol can be used for the transmission of data between the peripheral unit FIP and service control node CSE; a signaling with the ISUP protocol or the DSS.1 protocol is not necessary. However, it is an appropriate, but not a necessary, requirement that the connection in the Internet or data network IPN is established with a real-time-compatible protocol in order to permit rapid transmission of data, which of course must take place in parallel with the subscriber interaction. For example, an INAP protocol or CAP protocol could be used with the data network's own protocol, for example the TCP/IP protocol of the Internet, as an underlying transport protocol layer. It is also advantageous that usually low tolls, often only the local rate, are charged for connections via the Internet, which benefits the subscriber particularly when he or she is located in other networks.

The additional service data which are made available to the peripheral unit FIP by the service control node CSE via the data connection depend of course on the intelligent service which is being respectively used, and can constitute, for example, information for a PlayAnnouncement instruction, a PromptAndCollect instruction and the correlation identity which has already been implicitly transmitted to the peripheral unit FIP. The service data may be requested by the peripheral unit FIP or else transmitted by the service control node CSE without request, the latter being possible and advantageous because the service control node CSE has, as a result of the preceeding dialog with the switching center MSC, sufficient information for a correct transmission of the service data required by the peripheral unit FIP. The peripheral unit FIP uses the received service data to implement the subscriber interaction.

The subscriber interaction of the intelligent service can in this way contain specific announcements in a desired subscriber-specific language—generally that of the announcement of the home network HTN—or the request for the subscriber to enter information, in which case the specific output/input format, or the one which is customary for the subscriber TNR, from the home network HTN, can advantageously be used. If necessary, for example as a result of a particular profile of the subscriber input, further service data are exchanged during and/or at the end of the subscriber interaction between the peripheral unit FIP and the service control node CSE; in particular the peripheral unit FIP can transmit to the service control node CSE an event message or acknowledgment message via the data connection at the end of the interaction. The messages which contain these further data can additionally be flagged or marked with the correlation identity in order to permit the unambiguous assignment to the subscriber interaction. This may be necessary because the peripheral unit FIP can generally implement a plurality of subscriber interactions simultaneously or in a "time sharing" mode.

After the termination of the subscriber interaction, the connection from the switching center MSC to the peripheral unit FIP is terminated. If the above-mentioned continuation feature, for example the DP9B-R is set in the switching center MSC, it transmits an appropriate message, for example an ERB message ("event report") to the service control node CSE, which then controls the call process in a known manner using the information obtained from the switching center MSC and/or from the peripheral unit FIP.

Unless the data connection in the IPN is a permanent connection, it is terminated after the termination of the data exchange between the peripheral unit FIP and the service control node CSE, in which case it is released, depending on the conditions of the exchange of data, by the peripheral unit or by the service control node. The data connection can also be maintained temporarily for a given time by the service control node CSE if this appears more favorable for the respective service, for example because subsequent subscriber interactions are expected. After the release or clearing of the data connection, the correlation identity is released in the peripheral unit FIP and in the service control node CSE.

I claim:

1. A communications network comprising:
    a telephone system having a telephone network, an intelligent network, a data network, and a subscriber, the intelligent network being configured for exchanging digital information, being linked to the telephone network, and having a service control node for managing and controlling intelligent services, the subscriber being a service-authorized subscriber authorized to use at least one of the intelligent services, and the service control node having a data network access, wherein said service control node is configured to select a peripheral unit which can be reached by the said service control node over said data network and linked to said telephone network, according to a location of the subscriber and desired intelligent services.

2. The configuration according to claim 1, wherein said service control node is configured to transmit to a switching center a message with a destination call number for addressing of said peripheral unit and a correlation identity as a first or initial information item for said peripheral unit.

3. The configuration according to claim 2, wherein said peripheral unit transmits, after terminating the interactive exchange of the messages with the service-authorized subscriber, an acknowledgment message to the service control node, the acknowledgment message containing data determined from the interactive exchange of the messages.

4. The configuration according claim 1, wherein said peripheral unit is assigned to the telephone network linked to the intelligent network of the telephone system.

5. The configuration according claim 1, wherein said peripheral unit requests, from the data network, a connection set-up to the service control node.

6. The configuration according to claim 1, wherein said peripheral unit is assigned to the telephone system, the telephone system being a mobile system, and said peripheral unit establishes a radio connection to the subscriber, the subscriber being a mobile subscriber.

7. The configuration according to clam 1, wherein said peripheral unit is configured to operate in accordance with a GSM standard and is assigned to the telephone system, the telephone system being a GSM network, and said peripheral unit establishes a radio connection to the subscriber, the subscriber being a mobile subscriber.

8. The configuration according to claim 1, wherein said peripheral unit is configured for an interactive exchange of messages with a plurality of subscribers.

9. In a communications network including a data network, a telephone system configuration, the communications network comprising:
   a telephone system including a telephone network, an intelligent network, and a subscriber, said intelligent network being linked to said telephone network and having a service control node for managing and controlling intelligent services, said subscriber being a service-authorized subscriber authorized to use at least one of the intelligent services, and said service control node having access to said data network configured for exchanging digital information; and
   said service control node configured to select a peripheral unit which can be reached by the said service control node over said data network and linked to said telephone network, according to a location of said subscriber and desired intelligent services.

10. The telephone system configuration according to claim 9, wherein said service control node is configured to transmit to a switching center a message with a destination call number for addressing of said peripheral unit and a correlation identity as a first or initial information item for said peripheral unit.

11. The telephone system configuration according to claim 10, wherein said peripheral unit transmits, after terminating the interactive exchange of the messages with said service-authorized subscriber, an acknowledgment message to said service control node, the acknowledgment message containing data determined from the interactive exchange of the messages.

12. The telephone system configuration according to claim 9, wherein said peripheral unit is assigned to said telephone network linked to said intelligent network of said telephone system.

13. The telephone system configuration according to claim 9, wherein said peripheral unit requests, from the data network, a connection set-up to said service control node.

14. The telephone system configuration according to claim 9, wherein said service-authorized subscriber is one of a temporary subscriber and a continuous subscriber of said telephone network linked to said intelligent network.

15. The telephone system configuration according to claim 14, including further peripheral units, said peripheral unit and said further peripheral units being accessible by said service control node via the data network and being usable by said telephone network, said service control node selecting a given one of said peripheral units based on a subscriber location and based on a desired one of the intelligent services.

16. The telephone system configuration according to claim 15, wherein said service control node transmits, to said telephone network, a message including a destination information for addressing said peripheral unit and a correlation identity containing an initial information for said peripheral unit, the initial information relating to the desired one of the intelligent services.

17. The telephone system configuration according to claim 9, wherein said service control node is configured for an access to a computer network operating as the data network.

18. The telephone system configuration according to claim 9, wherein said service control node is configured for an access to an Internet network operating as the data network.

19. The telephone system configuration according to claim 9, wherein said service-authorized subscriber is a mobile subscriber and wherein said telephone system is a mobile system for establishing a radio connection for said mobile subscriber.

20. The telephone system configuration according to claim 19, wherein said mobile system is implemented as a GSM network.

21. A method for implementing an intelligent service, the method which comprises:
   offering an intelligent service through an intelligent network of a telephone system;
   managing and controlling the intelligent service with a service control node of the intelligent network;
   interactively exchanging messages between a peripheral unit of the telephone system and a subscriber of the telephone system, the subscriber being authorized to use at least the intelligent service;
   linking a telephone network of the telephone system to the intelligent network;
   exchanging information relating to the intelligent service between the peripheral unit and the service control node via a connection established in a data network set up for an exchange of digital information; and
   selecting a peripheral unit which can be reached by the service control node over the telephone system, according to a location of said subscriber and desired intelligent Services.

22. The method according to claim 21, which comprises:
   transmitting to a switching center from the service control node a message with a destination call number for addressing the peripheral unit and a correlation identity as a first or initial information item for the peripheral unit.

23. The method according to claim 22, which comprises terminating the interactive exchange of the messages between the peripheral unit and the subscriber; and
   subsequently transmitting, to the service control node, an acknowledgment message containing data determined from the interactive exchanging of the messages.

24. The method according to claims 21, wherein the subscriber authorized to use at least the intelligent service uses the intelligent service as a subscriber of the telephone network linked to the intelligent network.

25. The method according to claim 24, which comprises, prior to one of carrying out the intelligent service and interactively exchanging the messages, selecting a given peripheral unit from the group consisting of the peripheral unit and further peripheral units accessible by the service control node via the data network and usable by the telephone network, the selecting step being based on a subscriber location and being based on the intelligent service being desired.

26. The method according to claim 25, which comprises:
transmitting, from the service control node to the telephone network, a message having a correlation identity and a destination information for addressing the peripheral unit; and supplying the peripheral unit with the correlation identity as an initial information relating to the intelligent service.

27. The method according to claim 21, which comprises exchanging the information relating to the intelligent service via a computer network.

28. The method according to claim 21, which comprises exchanging the information relating to the intelligent service via an Internet network.

29. The method according to claim 21, which comprises using a mobile subscriber as the subscriber and using a mobile system as the telephone system for establishing a radio connection for the mobile subscriber.

30. The method according to claim 29, which comprises implementing the mobile system as a GSM network.

* * * * *